3,206,466
CATALYZED METHOD OF PREPARING CUPROUS MERCAPTIDES
Walter Reifschneider, Midland, Mich., assignor to The Dow Chemical Company, Midland, Mich., a corporation of Delaware
No Drawing. Filed June 27, 1962, Ser. No. 205,532
6 Claims. (Cl. 260—299)

The present invention is directed to a method of preparing cuprous salts of mercaptans: The term "mercaptan" is used in the present specification and claims to designate an organic compound of the structure $$R\text{—}S\text{—}H$$

wherein R is an aliphatic, heterocyclic, cycloaliphatic, or aromatic group; and a cuprous salt thereof has the formula $$R\text{—}S\text{—}Cu$$

Thus the present invention is directed to the preparation of cuprous aliphatic, heterocyclic, or cycloaliphatic mercaptides and cuprous aromatic thiolates of an extreme variety.

According to the present method, an organic mercaptan of the formula $$R\text{—}S\text{—}H\text{—}$$

is caused to react with cuprous oxide in liquid reaction medium in the presence of a catalytic amount of a nitrogenous base.

The present synthesis is thus represented by the equation, $$2R\text{—}S\text{—}H + Cu_2O \xrightarrow{N+} 2R\text{—}S\text{—}Cu + H_2O$$

The method is extremely versatile and can be used in the preparation of products and working from starting materials wherein R is an organic radical of any identity that can take part in the mercaptan structure. Limitations of reaction time and temperature are seldom critical and when they are critical, such limitations can easily be complied with.

The synthesis of a few cuprous mercaptides by methods embodying this general equation has long been known: the employment of the nitrogenous base is new and results in the preparation in excellent yield, in a few minutes, of compounds of which similar preparation absent nitrogenous base has taken many hours. Furthermore, the method of the present invention readily and easily prepares cuprous mercaptides hitherto impossible to prepare.

The exact weight and identity of nitrogenous base are not critical, any such base being satisfactory and any catalytic amount of it producing the desired effect. Ammonia can be used. However, on a laboratory scale, it is usually preferred to employ as nitrogenous base a liquid nitrogenous substance of a boiling temperature suitable as a reaction temperature and as a component of liquid reaction medium, whereby to limit the temperature which results from heating. In this way, any reaction temperature within a wide range can be achieved, in presence of such base.

When employing liquid nitrogenous base as reaction medium, a pure compound or mixture of pure compounds can be employed to obtain a desired approximate boiling temperature. Available media include the following:

TABLE I

| Liquid nitrogenous base: | Boiling temperature, ° C. |
|---|---|
| Ethylamine | 16.6 |
| Diethylamine | 55.5 |
| Triethylamine | 89.5 |
| Pyridine | 115 |
| 2-picoline | 128 |
| 2,6-lutidine | 142 |
| 3-picoline | 144 |
| 4-picoline | 147 |
| 2,4-lutidine | 157 |
| 3,6-lutidine | 163 |
| 2,4,6-triethylpyridine (γ-collidine) | 172 |
| Ethanolamine | 172.2 |
| 4-ethyl-2-methylpyridine (α-collidine) | 179 |
| Aniline | 184.4 |
| 3-ethyl-4-methylpyridine (β-collidine) | 198 |
| Quinoline | 238 |
| Diethanolamine | 268 |

In carrying out the reaction, the mercaptan R—S—H is combined with copper oxide and nitrogenous base, in liquid reaction medium in any desired amounts and in any sequence or order. Good routine procedures for chemical syntheses are followed, such as vigorous and continuous stirring of the reaction mixture during reaction time, together with heating of the reaction mixture to a temperature at which the reaction goes forward promptly.

The reaction initiates immediately upon the contacting of mercaptan and copper oxide, in the presence of catalytic amount of nitrogenous base and in liquid reaction medium at any temperature over a wide range such as from about 20° to about 350° C. When reactants are combined at room temperature, at least small amounts of product are prepared immediately. Often the desired reaction goes quickly to completion at such temperatures. When it is desired to carry an otherwise slow reaction to completion with good yield promptly, reaction mixture is heated, preferably in the range of 50° to 175° C., whereat reaction goes forward promptly.

From the type equation hereinbefore, it is evident that the present method prepares water of reaction in stiochiometric amount. This water of reaction can be collected, as in water separator connected with a reflux condenser which is operatively connected with a vessel in which the synthesis takes place; and by measurement of water of reaction the progress of the synthesis can readily be ascertained.

Because the present method is of such wide applicability, compounds of distinctive reactivities may be encountered as starting materials and some of these deserve special mention.

When the starting mercaptan contains a plurality of thiol groups per nucleus, that is, compounds of the type R—(SH)$_n$ wherein $n$ is greater than 1, assuming sufficient amounts of copper oxide, a polymercaptide R—(S—Cu)$_n$ will be formed as would be expected. This is, in fact, one way in which such polymercaptide can be formed when desired.

When the starting compounds contain a carbonyl group, reaction temperatures should be kept as low as is convenient.

When the starting mercaptan contains one of more sulfonic acid or carboxyl groups, it is preferred to employ a nitrogenous base of sufficient activity that it will form, with the sulfonic or carboxyl group, a salt that will later be returned to acid form as the free mercaptide is purified. This is not usually necessary to a hydroxyl group, as in alcohols and phenols.

When employing compounds susceptible of explosion, temperatures at the low end of the recation temperature range are employed.

When employing a halogenated aromatic starting mercaptan such as $$X_2\text{—R—S—H}$$

wherein R is aromatic and $n$ is an integer up to and including the number of hydrogen atoms one less than those of the unsubstituted group R, copper oxide should be very finely divided, reaction temperatures should be relatively low and reaction times as short as will obtain good yield of desired product. This is true because, under the conditions of the present process, a cuprous mercaptide has a tendency to react at the site of such halogen to obtain a thioether which may be a polymeric thioether in the nature of a tarry residue. The thioetherification of aromatic halides at most goes forward much more slowly than the reaction to prepare cuprous mercaptide: and by control of temperatures and reaction times, skilled chemists will be able to prepare a desired cuprous salt of halogenated aromatic mercaptan with minimal losses in unwanted reactions.

Such losses tend to be least with chlorinated and fluorinated mercaptan starting materials and greatest with iodinated starting materials.

When a starting halogenated mercaptan $$X_n\text{—R—S—H}$$

is aliphatic, that is, when the radical R is aliphatic in nature, the reaction $$n(X_n\text{—R—S—Cu}) + X_n\text{—R—S—Cu} \rightarrow (X_n\text{—R—S})_n\text{—R—S—Cu} + nCu\text{—X}$$

to prepare a thioether or polythioether compound has at least some tendency to go forward. When X is of high atomic weight and R is of low molecular weight, such reaction may go forward nearly as fast, under the stated conditions, as the reaction $$2X_n\text{—R—S—H} + Cu_2O \rightarrow 2X_n\text{—R—S—Cu} + H_2O$$

to prepare a cuprous halomercaptide.

In this situation, yield of desired product can be favored in several ways. Firstly, the relative amount of nitrogenous base catalyst can be reduced and substantial proportions of reaction medium may be inert liquids: as this is done, the rate of both the above reactions is retarded, but the rate of thioether formation is more retarded than is the rate of cuprous mercaptide formation.

Copper oxide, finely divided, can be provided in abundance. The reaction to prepare cuprous salt of haloaliphatic mercaptide then becomes slow, but formation of thioether becomes even slower. When this is desired, suitable inert reaction media include dimethyl formamide and alcohols or mixtures of alcohols chosen for boiling temperatures at which it is desired to carry out the reaction. Some available inert solvents include:

TABLE II

| Inert liquid medium: | Boiling temperature, ° C., at 760 mm. |
|---|---|
| Methanol | 64.7 |
| Ethanol | 78.3 |
| Benzene | 80.0 |
| Isopropanol | 82.3 |
| n-Propanol | 97.2 |
| Isobutanol | 107.9 |
| Toluene | 111.0 |
| n-Butanol | 117.7 |
| Methyl-Cellosolve (α-hydroxy-β-methoxy ethane) | 125.0 |

TABLE II—Continued

| Inert liquid medium: | Boiling temperature, ° C., at 760 mm. |
|---|---|
| n-Pentanol | 138.0 |
| Mixed xylenes | 140 |
| Dimethyl formamide | 153.0 |
| n-Hexanol | 155.8 |
| Cyclohexanol | 161.5 |
| Octanol-2 | 179.0 |
| n-Octanol | 194.0 |
| Ethylene glycol | 197.5 |
| Benzyl alcohol | 205.4 |
| n-Decanol | 232.9 |
| Glycerol | 290 |

Thus, by judicious control of relative weight of nitrogenous base in such inert liquid reaction medium as dimethylformamide, an alkanol, and the like, and of other factors, as noted, the chemist desiring to prepare a particular cuprous salt of haloaliphatic mercaptan according to the present invention will be able to obtain desired product in good yield and in satisfactory purity. Thioether impurities can thereafter be washed away, with solvents, from the relatively insoluble products of the presented method.

When employing a liquid reaction medium, a catalytic amount of nitrogenous base, copper oxide, and an organic mercaptan of at least ordinary reactivity, reaction usually begins at a good rate at room temperature. Heating is seldom or never needed to drive reaction temperatures above 160° C.

When employing a haloaliphatic mercaptan compound of the sort readily susceptible of undesired side reactions, it is preferred, immediately upon completion of the formation of desired product to quench—that is to say, to dilute with a non-solvent for product, and cool—the reaction mixture promptly, and thereafter also promptly to filter and remove product, and wash and preferably dry the resulting product.

Product mercaptides of the present invention tend to be insoluble in media in which the media fluids and starting materials except copper oxide, are soluble. Hence, when employing copper oxide in an amount that is entirely consumed, product usually forms as the least soluble component of a precipitate and can be recovered by filtration and washed with organic liquid to purify.

When product free of copper oxide is desired, excess copper oxide should be avoided. When employed and it is desired to remove such excess it can be removed by solvent extraction of cuprous mercaptide with a pyridine, or a mono- or dimethyl pyridine solvent. However, this tends to be slow and inefficient. Cuprous mercaptides of molecular weight above about 150 tend to be soluble in benzene or diethyl ether or the like and can be extracted with such solvent from copper oxide. The easiest way to remove excess copper oxide from product cuprous mercaptide is usually to react any excess copper oxide with further mercaptan to obtain further product, and then wash away excess mercaptan, using, for example, reaction medium as solvent.

The present mercaptides are highly advantageous intermediates in various synthesis: and the mixed product resulting from use of mixed mercaptans may be used to prepare chemically related derivatives of dissimilar properties: in which case separation of the derivatives may be easier than separation of the parent cuprous mercaptides that are products of the present invention.

In preparation of cuprous mercaptides according to the present invention, conditions of a wide range may be used and no difficulty is encountered when the group R in the organic mercaptan is, in particular, an aromatic, cycloaliphatic, or aliphatic hydrocarbon group, or an unsubstituted simple or aryl condensed heterocyclic group of which any heteroatom is selected from oxygen nitrogen, and sulfur: also, when such particular group contains as substitutents only amino, mono- or dialkylamino, alkoxycarbonyl, hydroxy, and alkoxy.

The following examples, without more, will enable those skilled in the art to practice the present invention.

Example 1

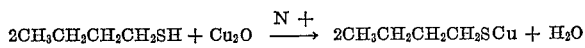

A reaction mixture is prepared, consisting of 18.2 grams (0.2 mole) n-butylmercaptan, 14.2 grams (0.1 mole) cuprous oxide, 140 milliliters quinoline and 20 milliliters pyridine. The mixture is gradually heated with stirring, and under nitrogen blanket. Within five minutes the reaction is complete, at an upper limit temperature of less than 100° C. Thereafter, the resulting mixture is cooled, filtered, and residue is washed with petroleum ether and air dried to obtain, in about 95 percent yield, the cuprous salt of n-butylmercaptan. This compound is a white powder: it decomposes when heated to about 245°–250° C. Applied in low concentrations as a dust to lone star ticks it occasions 100 percent kill. Typically, such results are obtained from dusts containing one weight percent of the present compound.

As prepared in the method of the prior art, eight to 150 hours in refluxing ethanol were required to prepare the present compound from cuprous oxide and n-butanethiol.

In procedures essentially the same as those foregoing except that reaction time is somewhat longer—about a half hour, total; and upper limit temperature is between 75° and 100° C. in a picoline reaction medium, there is prepared a cuprous derivative of 1-dodecanethiol from dodecanethiol. The product is a tan powder melting with decomposition at about 165°–170° C. It is an excellent arachnicide. Aqueous dispersions containing a half gram thereof per hundred milliliters of preparation, applied as a spray to lone star tick (a cattle parasite) cause 100 percent kill of the ticks.

Also, from 2-mercaptobenzothiazole, in a reaction in boiling, 2,4-lutidine there is prepared the cuprous derivative of mercaptobenzothiazole as a brown powder infusible at temperatures up to 340° C.

Also from methyl mercaptan, supplied as a gas bubbled into reaction mixture, there is obtained the cuprous salt of methyl mercaptan.

From ethyl mercaptan, cuprous ethanethiolate as a white powder decomposing at above 260° C.

From 2-methyl-2-propanethiol, a golden yellow cuprous derivative of 2-methyl-2-propanethiol melting with decomposition at about 180° C.

From cyclohexylmercaptan, a white to tan powdery cuprous derivative of cyclohexanethiol decomposing at about 300° C.

Example II.—Cuprous pentachlorobenzenethiolate

A reaction mixture is prepared comprising 28.25 grams (0.1 mole) pentachlorobenzenethiol, and 7.2 grams (0.05 mole) cuprous oxide, dispersed together with stirring in 500 milliliters 2,4-lutidine as liquid reaction medium. The resulting mixture is heated under reflux with stirring under nitrogen blanket until a water separator has collected the theoretical yield of water of reaction: about 30 minutes.

The reacted mixture is quickly cooled, diluted with an equal volume of methylcyclohexane, filtered, the filtrate washed with further methylcyclohexane, and vacuum dried. As a result of these procedures there is obtained a cuprous derivative of pentachlorobenzenethiol as an ochre powder soluble in ethanol and in xylene and being of the formula

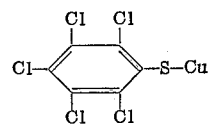

The compound is fungicidal: it decomposes when heated at an undetermined temperature above 360° C.

In similar procedures, employing p-chlorobenzenethiol, and slightly less than stoichiometric copper oxide, there is obtained a cuprous p-chlorobenzenethiolate as an orange powder decomposing with softening at a temperature above about 300° C.

Also, from o-hydroxy benzenethiol, a cuprous o-hydroxybenzenethiolate.

From 2-naphthalenethiol and cuprous oxide, a cuprous 2-naphthalenethiolate.

From p-mercaptophenyl acetate, an S-cuprous derivative.

Similarly, the reaction of thiobenzoic acid and copper oxide obtains the S-curous salt of thiobenzoic acid.

Also from p-diethylaminobenzenethiol (that is, p-mercapto-N,N-diethylaniline) a cuprous thiolate thereof.

Also from 1-mercapto-2,3-propanediol (a colorless oil) a compound of the formula

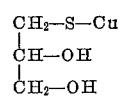

From 4-fluoro-1-butanethiol and cuprous oxide in 95 percent ethanol mixed with 5 percent triethylamine, the cuprous salt of 4-fluoro-1-butanethiol as a white solid that is purified by chloroform wash.

I claim:
1. Method of preparing a compound of the formula R—S—Cu which comprises causing a reaction between a mercaptan compound of the formula R—S—H and cuprous oxide, in an organic liquid reaction medium which is a nitrogenous base, wherein R is an organic radical.
2. Method of claim 1 wherein R is an aliphatic group.
3. Method of claim 1 wherein R represents an aromatic radical.
4. Method of claim 1 wherein R represents a heterocyclic group.
5. Method of claim 1 wherein the cuprous oxide is supplied to the reaction mixture in an amount not greater than that amount stoichiometric with mercaptan compound.
6. Method of claim 1 wherein the mercaptan compound and cuprous oxide are combined with nitrogenous base catalyst and reaction medium at a temperature in the range of from 20° to 175° C. with stirring and maintained under these conditions until stoichiometric water of reaction has been evolved.

References Cited by the Examiner

UNITED STATES PATENTS 2,414,035   1/47   Fox _____ 260—438

OTHER REFERENCES

Reid: Organic Chemistry of Bivalent Sulfur, volume I (New York, 1958), pages 145–7.

NICHOLAS S. RIZZO, *Primary Examiner.*